United States Patent [19]

Bartolome

[11] 4,080,299

[45] Mar. 21, 1978

[54] COFFEE FILTER FOR COFFEE POTS HAVING A UNITARY FILTERING ELEMENT

[76] Inventor: Roberto Diaz Bartolome, C. Arrieter B-2, 3° Izda., Sopelana, Biscay, Spain

[21] Appl. No.: 602,413

[22] Filed: Aug. 6, 1975

[30] Foreign Application Priority Data

Aug. 7, 1974 Spain .................................... 205.159

[51] Int. Cl.² ...................... B01D 23/28; B01D 35/28
[52] U.S. Cl. ...................................... 210/479; 99/295; 99/323; 210/481; 210/482; 210/484; 210/485; 210/489; 426/433
[58] Field of Search ............... 210/455, 464, 465, 469, 210/473–482, 483, 484, 489, 485; 99/295, 323; 426/433

[56] References Cited

U.S. PATENT DOCUMENTS

| Re. 27,959 | 4/1974 | Alexander et al. ........................ 99/295 |
| 557,399 | 3/1896 | Knight .................... 210/476 |
| 789,062 | 5/1905 | Prescott ........................... 210/476 X |
| 2,373,987 | 4/1945 | Wolcott et al. ................... 210/497 X |
| 2,483,000 | 9/1949 | Brant ..................................... 210/479 |
| 3,374,897 | 3/1968 | Martin ................................. 210/474 |
| 3,388,804 | 6/1968 | Hester .............................. 210/477 X |
| 3,610,132 | 10/1971 | Martin et al. ........................ 99/295 |
| 3,651,947 | 3/1972 | Schollhamer ........................ 210/474 |
| 3,849,312 | 11/1974 | Wecker .......................... 210/455 X |
| 3,854,389 | 12/1974 | Hillemann .............................. 99/295 |

FOREIGN PATENT DOCUMENTS

| 624,055 | 7/1927 | France ................................. 210/479 |
| 22,709 of | 1913 | United Kingdom ................ 210/477 |
| 1,509 of | 1891 | United Kingdom ................ 210/475 |
| 809,414 | 2/1959 | United Kingdom ................ 210/474 |
| 9,943 of | 1914 | United Kingdom ................ 210/474 |
| 12,556 of | 1893 | United Kingdom ................ 210/473 |
| 9,643 of | 1914 | United Kingdom ................ 210/473 |

Primary Examiner—Frank W. Lutter
Assistant Examiner—Frank Sever
Attorney, Agent, or Firm—Fleit & Jacobson

[57] ABSTRACT

A coffee filter for coffee pots comprising a container, and a filtering element is disclosed. The container comprises a bottom surface having a plurality of openings and a lateral surface extending from the bottom surface around the periphery of the bottom surface. A plurality of axial ribs are connected to the inside of the lateral surface. The axial ribs are spaced equidistantly about the inside of the lateral surface. Each of these ribs has an inclined edge surface such that the surface defined by the inclined edges of the axial ribs is in the shape of an inverted truncated cone. The bottom edges of the axial ribs terminate in a supporting ramp which is a radial projection extending from the inclined edge of each axial rib. The filtering element is supported, and rests upon, the supporting ramp. The filtering element comprises a unitary filter made up of a pair of frames having a circular cross-section and a filtering sheet comprising a fine mesh material of circular shape with a diameter greater than the diameter of the frames. Both the frames and the filtering sheet are plastic. The filtering sheet is placed in the container and rest on the supporting rims. The portion of the filtering sheet that extends beyond the frame is bent upwardly to form a filtering wall which is supported by the inclined edges of the axial ribs.

3 Claims, 3 Drawing Figures

COFFEE FILTER FOR COFFEE POTS HAVING A UNITARY FILTERING ELEMENT

This invention relates to a coffee filter for coffee pots, and is concerned, more particularly, with a coffee filter, that is designed especially for use in coffee pots, such as drip style coffee pots wherein the water drips through the coffee by the force of gravity.

The filters of this type that have been known up to this time, have the basic inconveniences of complicated assembly and removal, as well as of difficulties in keeping the filter clean.

In the known filters of the afore-mentioned type, the filtering element consists of metal mesh, the lower part of which is normally soldered to a supporting base that can be removed from the rest of the coffee pot.

The metal mesh deteriorates easily, due to friction and finally comes apart and becomes unuseable. Consequently, these filters last only for a very limited time.

It is an object of this invention to provide a filter in which the filtering mesh is not subjected to any friction and is joined to an appropriate support in such a way that there is no risk of any accidental separation; of the filtering mesh with its support.

Another object of this invention consists in the production of a filter of the afore-mentioned type in which the various pieces or members can be removed and cleaned with great ease, so that the entire filter can at all times be maintained in perfect sanitary condition.

Still another object of this invention is the production of a filter in which the filtering member will have a greater filtering capacity.

In accordance with the invention, the filter consists of a container or casing and a filtering member. The container has the general form of a pail with its bottom having perforations or openings and a lateral surface. The inside of the lateral surface has a series of equidistant axial ribs, in the manner of small partitions. The free edge of the axial ribs, that is the edge of the ribs that is not connected to the container wall, is inclined so that the internal surface defined by the series of axial ribs forms the surface of an inverted truncated cone, while said ribs present, near its lower end, a widening that defines projecting flat surfaces that are located on the same level and are designed to serve as support for the filering member.

The filtering element consists of two superimposed circular frames and a filtering sheet therebetween. Each frame comprises a peripheral rim, a central core and interconnecting radial arms. The filtering sheet consists of a fine mesh of circular shape, with a diameter larger than that of the frames.

The frames, as well as the mesh that make up the filtering sheet, are made of a fusible material such as plastic. The two frames are joined on either side of the mesh, so that the mesh is thereby protected and fixedly secured to the frames, forming a unitary assembly.

As has been indicated, the mesh has a circular shape with a diameter that is larger than that of the frames, so that the mesh extends beyond their periphery, thus forming a peripheral flange that bends upward when positioning the filtering member within the container to define a filtering wall that retains the coffee perfectly and increases the filtering surface. The increase of the filtering surface by the filtering wall is designed to obtain larger volumes of flow of the coffee, i.e., the capacity of the system is increased.

Inasmuch as the mesh is joined with the plastic support, its durability is practically unlimited, and the filter is hermetic. There does not exist the risk inherent in the common filters in which the mesh is soldered exteriorly to a support from which it becomes easily detached.

All of the characteristics and advantages as explained above will be understood more easily on the basis of the following description that makes reference to the attached drawings, in which a preferred embodiment is shown:

Figure 3:
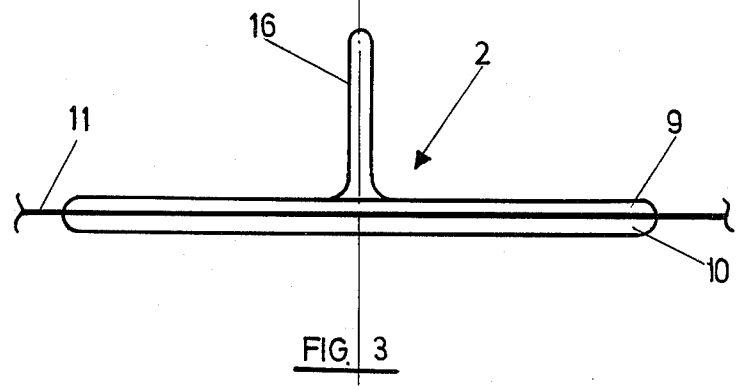
FIG. 3 is a lateral elevation of the filtering element.

The filter consists of a container or casing 1 and a filtering element 2, shown in FIG. 3.

The container 1 takes the form of a small basket the bottom 3 equipped with perforations or openings 4. The inside of its lateral wall has a series of equidistant axial ribs 5, in the manner of small partitions. The portion of the rim 5 is inclined, and its lower end has a widening that defines a projecting flat surface or rim 6 which is designed to serve as support for the filtering member 2. The filtering element rests on the rim 6 for support. Underneath the container 1 legs 7 are shown supporting the container. Likewise, the container may have an intermediate supporting projecting flat surface 8 on the outside of its wall.

The filtering member 2 consists of two circular frames 9 and 10, and the filtering sheet 11 is positioned therebetween. The filtering sheet 11 consists of a mesh of circular shape with a diameter that is larger than that of the frames 9 and 10.

The frames 9 and 10 and the sheet 11 are made of plastic, in such a way that each of the frames is based on the mesh 11, one on either side of the latter, and is, in that way, protected and firmly joined so as to form one individual assembly.

Figure 1:
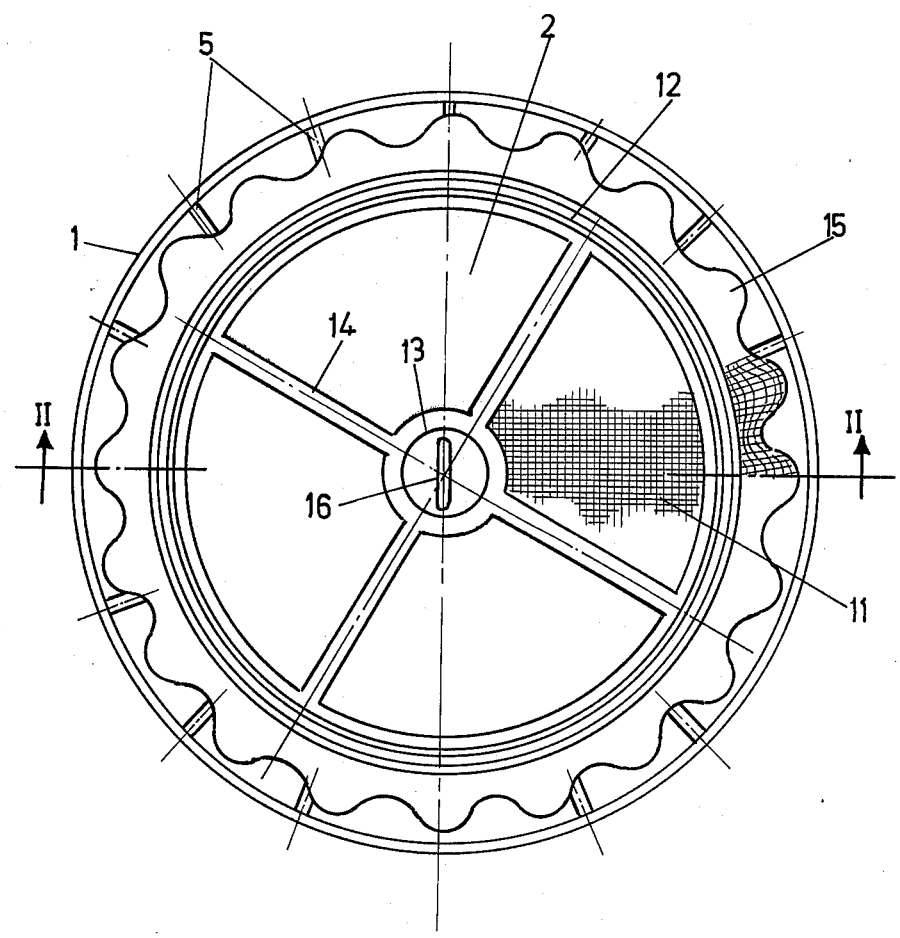
FIG. 1 is a top view of the filters designed in accordance with the invention.
Figure 2:
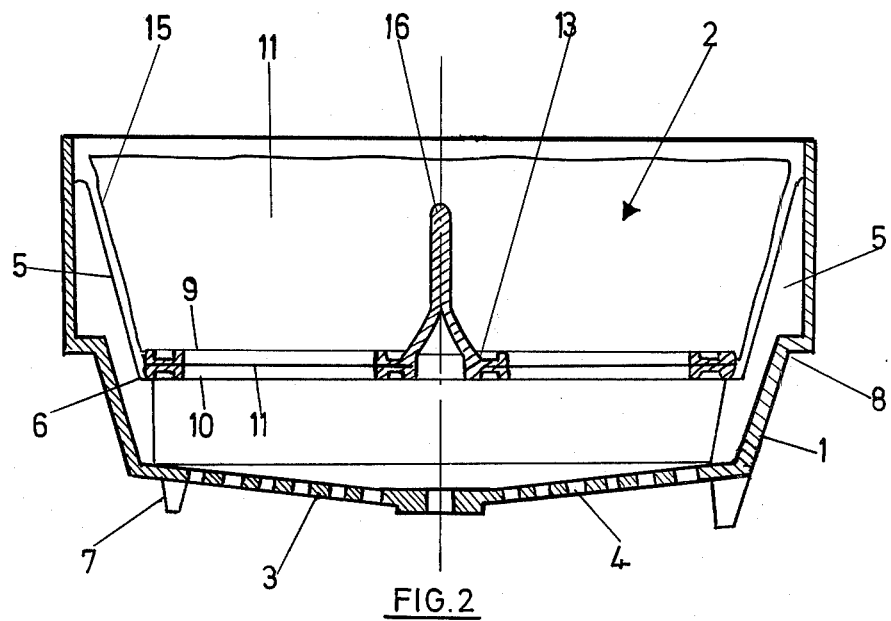
FIG. 2 is a section through line II—III of FIG. 1.

As may be seen in FIG. 1, the frames 9 and 10 comprise a circular rim 12, a central core 13 and radial joining arms 14. The two frames are arranged so as to face one another, one for each side of the mesh 11.

As can be seen clearly in FIG. 3, the mesh 11 has a diameter that is larger than that of the frames 9 and 10 and projects beyond them partly or in the form of a peripheral flange that is turned upward where the filtering element 2 is inserted in the container, and defines a wall 15 that is slightly corrugated as may be seen in FIG. 1. This wall 15 is designed to retain the coffee and to increase the filtering surface, and thereby to achieve a larger volume of flow of the coffee.

The upper frame 9 may have, in its center 13 a projecting part 16 that has been designed for holding said frame whenever it may become necessary to do so.

Despite its composition, as described above, the filter assembly can be disassembled easily, inasmuch as it is sufficient to pull out the filtering element which can be cleaned very easily, due to the fact that part 15 of the mesh or filtering element, which projects beyond the frame, is flexible.

The filtering mesh 11 is kept in place between the upper and lower frames, 9 and 10 respectively. Since it is firmly attached to the assembly, its durability is practically unlimited while at the same time, a hermetic filter is achieved that does not permit any coffee particles to pass through.

The filter in accordance with the invention may be used in coffee pots operating by gravity or by dripping and may be used in manually operated coffee pots.

I claim:

1. A coffee filter for drip-type coffee pots comprising a container and a filtering element, said container comprising a bottom surface having a plurality of openings, a lateral surface extending from the bottom surface around the periphery thereof to define the walls of the container, a plurality of axial ribs connected to the inside of the lateral surface, said axial ribs spaced equidistantly about the inside of the lateral surface, each of said axial ribs having an inclined edge surface such that the surface defined by the plurality of inclined edges of the axial ribs is in the shape of an inverted truncated cone, a filtering element comprising a pair of plastic frames having a circular cross-section, each of said frames comprising a central portion, and a circular rim, a filtering sheet comprising a fine mesh plastic material of circular shape, the diameter of said filtering sheet being greater than the diameter of said frames so that said filtering sheet has a portion extending beyond the periphery of said frames, said frames fixedly secured to said filtering sheet on either side of the filtering sheet to form a unitary filtering element, means for supporting said filtering element in said container comprising a plurality of supporting rims extending from the inclined edges of the axial ribs, said filtering element positioned within said container and supported on said supporting rims, said filtering sheet portion being dimensioned to extend beyond the periphery of the frames to form a filtering wall which is supported by said inclined edges of the axial ribs.

2. A coffee filter as claimed in claim 1 further comprising an elongated projection integrally connected with the central portion of one of said frames and extending perpendicularly from the plane defined by said frames for removing the filtering element from the container.

3. A coffee filter as claimed in claim 1 wherein said supporting rim comprises radial projections each extending from the inclined edge of each axial rib.

* * * * *